US006638204B2

(12) United States Patent
Mizutani et al.

(10) Patent No.: US 6,638,204 B2
(45) Date of Patent: Oct. 28, 2003

(54) METHOD OF DISPOSAL OF WASTE CONTAINING HEAVY METAL

(75) Inventors: Makoto Mizutani, Sodegaura (JP); Satoshi Hachiya, Sodegaura (JP); Toshiyuki Akagawa, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 99 days.

(21) Appl. No.: 09/446,889

(22) PCT Filed: Jun. 30, 1998

(86) PCT No.: PCT/JP98/02925

§ 371 (c)(1),
(2), (4) Date: Feb. 2, 2000

(87) PCT Pub. No.: WO99/01236

PCT Pub. Date: Jan. 14, 1999

(65) Prior Publication Data

US 2002/0123659 A1 Sep. 5, 2002

(30) Foreign Application Priority Data

| | | |
|---|---|---|
| Jul. 1, 1997 | (JP) | 9-175902 |
| Oct. 23, 1997 | (JP) | 9-290657 |
| Oct. 23, 1997 | (JP) | 9-290658 |
| Oct. 23, 1997 | (JP) | 9-290659 |

(51) Int. Cl.[7] .......... B09B 3/00
(52) U.S. Cl. .......... 588/256; 588/236; 588/252
(58) Field of Search .......... 588/236, 256, 588/249, 252; 423/561.1, 566.1

(56) References Cited

U.S. PATENT DOCUMENTS

| | | | | | |
|---|---|---|---|---|---|
| 3,887,130 | A | * | 6/1975 | Chalmers | 239/132.5 |
| 5,562,589 | A | * | 10/1996 | Adams | 588/256 |
| 5,678,234 | A | * | 10/1997 | Colombo et al. | 588/256 |
| 5,935,618 | A | * | 8/1999 | Ikari et al. | 588/256 |

FOREIGN PATENT DOCUMENTS

| | | |
|---|---|---|
| JP | 49-72176 | 7/1974 |
| JP | 8-248253 | 9/1994 |
| JP | 7-55458 | 4/1995 |
| JP | 7-290024 | 11/1995 |
| JP | 8-3317 | 1/1996 |

OTHER PUBLICATIONS

Derwent translation of JP7–88458–A.*

* cited by examiner

*Primary Examiner*—Heather Shackelford
*Assistant Examiner*—John Kreck
(74) *Attorney, Agent, or Firm*—Oblon, Spivak, McClelland, Maier & Neustadt, P.C.

(57) ABSTRACT

(A) Heavy metal-containing wastes are kneaded in melt with (B) an alkali metal compound or an alkaline earth metal compound and (C) sulfur, or with (E) a sulfide, or with these along with (D) a salt of a metal of which the standard electrode potential is higher than that of the cation of the component (B) or (E), in the presence of a non-aqueous medium, and the resulting melt mixture is cooled and solidified. In the method of treating heavy metal-containing wastes, the heavy metals in the wastes are efficiently passivated, and the heavy metals thus passivated are not released from the treated wastes.

5 Claims, No Drawings

METHOD OF DISPOSAL OF WASTE CONTAINING HEAVY METAL

TECHNICAL FIELD

The present invention relates to passivation of the heavy metals in heavy metal-containing wastes. More precisely, it relates to methods of treating heavy metal-containing wastes suitable to passivating the heavy metals such as lead, cadmium, chromium and others in the wastes. The invention also relates to sealants suitable to the treatment. It further relates to solidified substances with high mechanical strength formed in the treatment.

TECHNICAL FIELD

Urban and industrial garbage and wastes are greatly increasing these days, and heavy metals often exist in the incinerated ash or fly ash discharged through incineration of such wastes. For protecting the environment, therefore, desired are some safe measures to make the incinerated ash or fly ash harmless.

One conventional method which has heretofore been proposed for that purpose comprises solidifying heavy metal-containing wastes with cement to thereby passivate the heavy metals in the solidified wastes. According to the method, however, it is difficult to completely passivate the heavy metals so as not to make them released at all from the solidified wastes. In addition, another problem with the method is that curing cement takes a lot of time.

Another method has been proposed, which comprises releasing the heavy metals from wastes by the use of mineral acids. However, the method is also problematic in that the metal-releasing acid treatment requires complicated operations and that an additional step of separately solidifying the wastes is needed.

On the other hand, disclosed is a method comprising adding a water-soluble sulfide, such as sodium sulfide, calcium sulfide or the like, to incinerator ashes and others discharged from usual incinerators, and kneading them to thereby passivate the heavy metals, such as lead, cadmium and others in the incinerator ashes and make them harmless, for example, in Japanese Patent Laid-Open Nos. 39262/1978, 1830/1980, 73091/1984, 111990/1988 and 24355/1997. In those, the method disclosed is to passivate the heavy metals in incinerator ashes into inert sulfides such as lead sulfide and others, thereby making them harmless. As a rule, however, the solubility of heavy metal sulfides in water is extremely low. Therefore, the particles of the heavy metal sulfides formed and deposited in the method are extremely fine, having a particle size of around 0.01 microns or so, and, in addition, many of them have relatively high dispersibility in water. For these reasons, the method disclosed is problematic in that the heavy metal sulfide particles formed therein pass through a paper filter having a mean pore size of 1 micron in the test stipulated in Notification No. 13 of the Director General of the Environment Agency of Japan. Japanese Patent Laid-Open No. 203981/1990 discloses a method of using a polymer substance with an organic carboxylic acid for solving the problem. However, the method is still problematic, as it is not economical.

DISCLOSURE OF THE INVENTION

Taking the above into consideration, we, the inventors have made the present invention, of which one object is to provide methods of treating heavy metal-containing wastes capable of efficiently and stably passivating the heavy metals in the wastes to thereby prevent the thus-passivated heavy metals from being released from the wastes.

Another object of the invention is to provide sealants and sealant promoters suitable to efficiently and stably passivating the heavy metals in heavy metal-containing wastes, etc.

Still another object of the invention is to provide compounds or compositions suitable to efficiently and stably passivating the heavy metals in heavy metal-containing wastes, etc. The compounds or compositions may be used as the sealant for passivating the heavy metals in heavy metal-containing wastes, etc.

Still another object of the invention is to provide solidified substances with high mechanical strength formed in the treating methods.

Specifically, the invention is summarized as follows:

(1) A method for treating heavy metal-containing wastes, which comprises melting and kneading (A) heavy metal-containing wastes, (B) an alkali metal compound or an alkaline earth metal compound and (C) sulfur in the presence of a non-aqueous medium, followed by cooling and solidifying the resulting melt mixture.

(2) The method of above (1) for treating heavy metal-containing wastes, wherein the alkali metal compound or the alkaline earth metal compound (B) is an alkali metal or alkaline earth metal hydroxide or oxide.

(3) A method for treating heavy metal-containing wastes, which comprises melting and kneading (A) heavy metal-containing wastes and (D) a sulfide in the presence of a non-aqueous medium, followed by cooling and solidifying the resulting melt mixture.

(4) A method for treating heavy metal-containing wastes, which comprises melting and kneading (A) heavy metal-containing wastes, (B) an alkali metal compound or an alkaline earth metal compound, (C) sulfur and (E) a salt of a metal of which the standard electrode potential is higher than that of the cation of the component (B), in the presence of a non-aqueous medium, followed by cooling and solidifying the resulting melt mixture.

(5) A method for treating heavy metal-containing wastes, which comprises melting and kneading (A) heavy metal-containing wastes, (B) an alkali metal compound or an alkaline earth metal compound and (C) sulfur in the presence of a non-aqueous medium, followed by cooling and solidifying the resulting melt mixture, and in which the component (A) and the component (C) are melted and kneaded before the component (B) is added thereto.

(6) A method for treating heavy metal-containing wastes, which comprises melting and kneading (A) heavy metal-containing wastes, (D) a sulfide and (F) a salt of a metal of which the standard electrode potential is higher than that of the cation of the component (D), in the presence of a non-aqueous medium, followed by cooling and solidifying the resulting melt mixture.

(7) The method of any one of above (4) or (6) for treating heavy metal-containing wastes, wherein the sulfide (D) is an alkali metal or alkaline earth metal sulfide.

(8) The method of any one of above (1) to (7) for treating heavy metal-containing wastes, wherein the non-aqueous is at least one selected from sulfur, asphalt, thermoplastic resins and thermosetting resins.

(9) The method of above (1) for treating heavy metal-containing wastes, wherein the component (B) and the component (C) are individually in the form of master batch pellets with the non-aqueous medium (except sulfur).

(10) A solidified substance with high mechanical strength, which is formed in any one method of above (1) to (9).

(11) A sealant for heavy metals, which comprises (B) an alkali metal compound or an alkaline earth metal compound and (C) sulfur.

(12) A sealant for heavy metals, which comprises (B) an alkali metal compound or an alkaline earth metal compound, (C) sulfur, and a non-aqueous medium.

(13) The sealant for heavy metals of above (12), wherein the non-aqueous medium is at least one selected from sulfur, asphalt, thermoplastic resins and thermosetting resins.

(14) The sealant for heavy metals of any one of above (11) to (13), wherein the ratio of the alkali metal compound or the alkaline earth metal compound (B) to the sulfur (C), (B)/(C) by mol, falls between 0.2 and 3.

(15) The sealant for heavy metals of any one of above (11) to (14), wherein the alkali metal compound or the alkaline earth metal compound (B) is an alkali metal or alkaline earth metal hydroxide or oxide.

(16) An alkali metal or alkaline earth metal sulfide as obtained by reacting (B) an alkali metal compound or an alkaline earth metal compound with (C) sulfur with stirring at 50 to 170° C. for 1 to 20 minutes.

(17) An alkali metal or alkaline earth metal sulfide of above (16), for which the ratio of the alkali metal compound or the alkaline earth metal compound (B) to the sulfur (C), (B)/(C) by mol, falls between 0.2 and 3.

(18) A sealant for heavy metals, which comprises the alkali metal or alkaline earth metal sulfide of above (16) or (17).

(19) The sealant of any one of above (11) to (15) or (18), which is for heavy metals in heavy metal-containing wastes.

(20) A sealant promoter for heavy metals, which comprises (B) an alkali metal compound or an alkaline earth metal compound, and a non-aqueous medium.

(21) The sealant promoter for heavy metals of above (20), wherein the alkali metal compound or the alkaline earth metal compound (B) is an alkali metal or alkaline earth metal hydroxide or oxide.

(22) A sealant promoter for heavy metals, which comprises (C) sulfur, and a non-aqueous medium.

(23) The sealant promoter for heavy metals of any one of above (20) to (22), wherein the non-aqueous medium is at least one selected from sulfur, asphalt, thermoplastic resins and thermosetting resins.

(24) The sealant promoter for heavy metals of any one of above (20) to (23), which is for heavy metals in wastes.

BEST MODES OF CARRYING OUT THE INVENTION

Modes of carrying out the invention are described below.

The first aspect of the invention is a method for treating heavy metal-containing wastes, which comprises melting and kneading (A) heavy metal-containing wastes, (B) an alkali metal compound or an alkaline earth metal compound and (C) sulfur in the presence of a non-aqueous medium, followed by cooling and solidifying the resulting melt mixture.

The component (A) heavy metal-containing wastes to be treated in the invention includes garbage-incinerated ash, fly ash, polluted mud, slag, coal ash (a type of fly ash), sludge and other wastes containing heavy metals such as chromium, copper, cadmium, mercury, lead, etc. If containing water, it is desirable to dry the wastes before they are treated.

The component (B) alkali metal or alkaline earth metal compound is not specifically defined so far as it is a compound containing an alkali metal or alkaline earth metal. For example, it includes alkali metal or alkaline earth metal oxides, hydroxides, and even inorganic salts such as sulfates, chlorides, carbonates and others, organic salts such as carboxylates, oxalates and others, as well as alkoxides, chelate compounds and other various compounds of alkali metals or alkaline earth metals. Of those, preferred are alkali metal or alkaline earth metal oxides and hydroxides. The morphology of the compounds for use in the invention is not specifically defined, but preferred are solid compounds. The solid compounds may be in any form of powder, grains, etc. Substances containing alkali metal or alkaline earth metal compounds, such as cement, are also usable as the component (B) in the invention.

As specific examples of the component (B), mentioned are alkali metal compounds such as NaOH, $Na_2O$, $Na_2CO_3$, KOH, $K_2O$, etc.; and alkaline earth metal compounds such as $Ca(OH)_2$, CaO, $Mg(OH)_2$, MgO, etc. Of those, preferred are NaOH, CaO and KOH. One or more of these compounds may be used either singly or as combined.

Some heavy metal-containing wastes that contain a large amount of the component (B) in themselves, such as fly ash, do not require any additional component (B), and may be treated with the other components except the component (B) . For example, the amount of the component (B) to be in fly ash could be known on the whole by preparing an aqueous suspension of fly ash and measuring the pH of the suspension. Where the pH measured is not lower than 10, preferably not lower than 11, it is not always necessary to add some additional component (B) to fly ash. However, for ensuring complete passivation of heavy metals in the treated wastes, the component (B) will be added even to the wastes of that type.

The amount of the component (B) to be used varies, depending on the amount of the heavy metals in the heavy metal-containing wastes to be treated, but may be not smaller than the equimolar amount or so of the heavy metals in the wastes. For example, the heavy metal content of fly ash falls between 0.01 and 5% by weight. Therefore, the amount of the component (B) to be added to fly ash may be from 0.1 to 10 parts by weight or so, relative to 100 parts by weight of fly ash (in dry). If the amount of the component (B) added is too small, the heavy metals in wastes could not be sufficiently passivated. However, even if too large, such a large amount of the component (B) could no more augment its effect, and using too much component (B) will be uneconomical.

Sulfur for the component (C) is not specifically defined, and may be any ordinary simple sulfur. It may be obtained from natural resources, or may be produced in desulfurization of natural gas or petroleum fractions. The purity of sulfur for use herein is not required to be specifically high. Regarding its morphology, sulfur may be in any form of powder or liquid. As the case may be, excess sulfur will serve as the non-aqueous medium.

The amount of the component (C) sulfur may well be around 0.2 to 3 molar times that of the component (B), in order to sufficiently passivate heavy metals. For example, for fly ash, the amount of sulfur may fall between 0.1 and 10 parts by weight or so relative to 100 parts by weight of fly ash (in dry). If the amount of sulfur added is too small, the heavy metals in wastes could not be sufficiently passivated. However, even if too large, such a large amount of sulfur could no more augment its effect, and using too much sulfur will be uneconomical.

As the non-aqueous medium in which the components (A) to (C) are dispersed, preferred are sulfur, asphalt, thermoplastic resins, thermosetting resins, etc. The non-aqueous medium is necessary for solidifying wastes. Sulfur acts as a sulfidizing agent and also as a dispersion medium.

Sulfur for the non-aqueous medium may be any one mentioned hereinabove for the component (C). Sulfur for the component (C) may be the same as or may differ from that for the non-aqueous medium with respect to its composition and morphology. Where the two are the same, the amount of sulfur to be used shall be enough for its function to disperse the components (A) to (C) and for its function to passivate heavy metals.

Various types of asphalt may be used herein, concretely including native natural asphalt, and also petroleum asphalt such as straight asphalt, blown asphalt, asphaltic residue separated in deasphaltation, etc. The penetration of asphalt for use herein is not specifically defined. Herein preferred is asphalt having a degree of penetration of from 0.1 to 100. This is because asphalt of that type has the advantage of high flame retardancy and enhances the mechanical strength of the solidified substances of wastes and therefore the application of the solidified substances is greatly expanded. As the solvent for deasphaltation, preferred are propane, butane and their mixture.

The thermoplastic resins usable herein include, for example, polyethylenes, polypropylenes, polystyrenes, polycarbonates, nylons, polyvinyl chlorides, petroleum resins, etc.; and the thermosetting resins also usable herein include, for example, epoxy resins, xylene resins, diallyl phthalate resins, phenolic resins, unsaturated polyester resins, etc.

The amount of the non-aqueous medium to be used may fall generally between 10 and 1000 parts by weight, but preferably between 10 and 100 parts by weight, relative to 100 parts by weight of the heavy metal-containing wastes (in dry) to be treated.

In the invention, the components (A) to (C) are melted and kneaded in a predetermined ratio in the presence of a non-aqueous medium such as that mentioned above. Regarding the order of kneading them, it is desirable that the component (A) and the component (C) are first melted and kneaded and thereafter the component (B) is added thereto, melted and further kneaded.

The temperature at which the components are melted and kneaded is preferably not lower than 50° C., but more preferably falls between 60 and 300° C., even more preferably between 90 and 200° C. The kneading time preferably falls between 1 and 40 minutes or so. In particular, after the component (C) is added to the component (A), the mixture may be kneaded for 1 to 30 minutes or so. After the component (B) is added thereto, the mixture may be kneaded for 0.1 to 20 minutes or so.

For melting and kneading the components, usable are any ordinary kneaders that are generally used for mixing and kneading powder and liquid. For example, usable are wheel-type, blade-type or roll-type kneaders.

After having been melted and kneaded, the resulting mixture is cooled and solidified whereby the heavy metals in the component (A) are passivated in the resulting solidified substance and are prevented from being released from it. In addition, the sulfudizing agent, if used excessively, is also prevented from being released from the solidified substance. After having been melted, the melt mixture could solidify within a few minutes even when it is left as it is. However, cooling the melt mixture in air or water is preferred, as the melt mixture can rapidly solidify.

As mentioned above, the components (A) to (C) are kneaded in melt in the presence of a non-aqueous medium, and then cooled and solidified whereby the heavy metals in the component (A) are passivated and are not released from the resulting solidified substance.

Preferably, the components (B) and (C) are separately melted and kneaded with the non-aqueous medium (except sulfur) to prepare master batch pellets, as the pellets are easy to handle.

The second aspect of the invention is described below.

The second aspect is a method for treating heavy metal-containing wastes, which comprises melting and kneading (A) heavy metal-containing wastes and (D) a sulfide in the presence of a non-aqueous medium, followed by cooling and solidifying the resulting melt mixture.

In this, the component (A) heavy metal-containing wastes to be treated is the same as that in the first aspect of the invention described above. Therefore, describing it is omitted herein.

Various types of sulfides are usable as the component (D), but preferred are sulfides of basic compounds, such as those with alkali metals or alkaline earth metals, or with ammonia, amines, anilines, etc. Concretely, they include sodium sulfide; sodium polysulfides such as sodium disulfide, sodium trisulfide, etc.; calcium sulfide; calcium polysulfides such as calcium disulfide, calcium trisulfide, etc.; potassium sulfide; potassium polysulfides such as potassium disulfide, potassium trisulfide, etc.; barium sulfide; barium polysulfides such as barium disulfide, barium trisulfide, etc.; as well as ammonium sulfide, sodium hydrosulfide, potassium hydrosulfide, etc. Of those, preferred are sodium polysulfides and calcium polysulfides. These sulfides may be used either singly or as combined.

The amount of the component (D) to be used varies, depending on the amount of the heavy metals in the heavy metal-containing wastes to be treated, but may be not smaller than the equimolar amount or so of the heavy metals in the wastes. For example, the heavy metal content of fly ash falls between 0.01 and 5% by weight. Therefore, the amount of the component (D) to be added to fly ash may be from 0.1 to 10 parts by weight or so, relative to 100 parts by weight of fly ash (in dry). If the amount of the component (D) added is too small, the heavy metals in wastes could not be sufficiently passivated. However, even if too large, such a large amount of the component (D) could no more augment its effect, and using too much component (D) will be uneconomical.

The non-aqueous medium in which the components (A) and (D) are dispersed is preferably selected from sulfur, asphalt, thermoplastic resins, thermosetting resins, etc., like in the first aspect of the invention. The non-aqueous medium additionally has the function of solidifying wastes. Specific examples of the non-aqueous medium and the conditions for kneading the components are the same as those in the first aspect of the invention, and describing them herein is omitted.

In the first and second aspects of the invention, metal salts such as those to be mentioned below may be additionally added to the system including the component (A).

Specifically, in the first aspect, (E) a salt of a metal of which the standard electrode potential is higher than that of the cation of the component (B), alkali metal or alkaline earthmetal, maybe added to the system; and in the second aspect, (F) a salt of a metal of which the standard electrode potential is higher than that of the cation of the component (D), that is, the metal constituting the sulfide of the component (D) may be added thereto. Specific examples of the metal for the component (E) in the first aspect or the component (F) in the second aspect include iron, aluminum, magnesium, zinc, copper, etc. The salts include, for example, sulfates, nitrates, carbonates, chlorides, hydroxides, etc. Specific examples of the salts are ferrous sulfate, ferric sulfate, aluminum sulfate, iron chloride, aluminum chloride, magnesium sulfate, iron hydroxide, aluminum hydroxide, etc.

The amount of the component (E) to be used may be generally from 0.5 to 5 times equivalents, but preferably from 0.7 to 3 times equivalent, more preferably from 1 to 2 times equivalents, relative to the number of equivalents as obtained by subtracting the number of equivalents of the heavy metals in the component (A) from the number of equivalents of the cation in the component (B). Similarly, the amount of the component (F) to be used may be generally from 0.5 to 5 times equivalents, but preferably from 0.7 to 3 times equivalent, more preferably from 1 to 2 times equivalents, relative to the number of equivalents as obtained by subtracting the number of equivalents of the heavy metals in the component (A) from the number of equivalents of the cation in the component (D).

The temperature at which the components are melted and kneaded in the process as above preferably falls between 90 and 200° C., more preferably between 110 and 200° C. If the temperature is lower than 90° C., sulfur could not dissolve in the system and its sulfidization therein will be retarded. However, if higher than 200° C., sulfur will form high-molecular substances thereby increasing the viscosity of the system. If so, kneading the system will require increased power. After the component (C) is added to the component (A), the mixture may be kneaded for 1 to 30 minutes or so. After the component (B) is added thereto, the mixture may be kneaded for 0.1 to 20 minutes or so.

In the embodiments where the component (E) or (F) is used, the non-aqueous medium to be used and also the conditions for melting, kneading, cooling and solidifying the system are the same as those in the others where neither the component (E) nor the component (F) is used. Therefore, describing them in detail herein is omitted.

In the first aspect of the invention where the component (E) is used and also in the second aspect thereof where the component (F) is used, the order of adding the component (E) or (F) to the system is not specifically defined. For example, in the first aspect, it is desirable that the component (E) is added to the system while or after the component (B) of (C) is kneaded in melt.

According to the treating method of the first and second aspects of the invention, not only the heavy metals in heavy metal-containing wastes can be passivated so as not to be released from the treated wastes but also dioxin can be sealed in the treated wastes.

The third aspect of the invention is described below, which provides compounds and also sealants or sealant promoters suitable to the method for treating heavy metal-containing wastes of the first and second aspects of the invention.

The first embodiment of the third aspect of the invention is a sealant comprising (B) an alkali metal compound or an alkaline earth metal compound and (C) sulfur.

The second embodiment thereof is a reaction product to be obtained by kneading (B) an alkali metal compound or an alkaline earth metal compound and (C) sulfur at a temperature falling between 50 and 170° C. for 1 to 20 minutes, and a sealant comprising the reaction product.

The third embodiment thereof is a sealant comprising (B) an alkali metal compound or an alkaline earth metal compound, (C) sulfur, and a non-aqueous medium (except sulfur).

The fourth embodiment thereof is a sealant promoter comprising (B) an alkali metal compound or an alkaline earth metal compound and a non-aqueous medium (except sulfur), or a sealant promoter comprising (C) sulfur and a non-aqueous medium (except sulfur).

These embodiments of the third aspect of the invention are described in detail hereinunder.

In the embodiments of the third aspect, the component (B) and the component (C) may be the same as those in the first aspect of the invention described above. Therefore, the detailed description of concrete compounds of those components is omitted herein. As the alkali metal compound to be used herein, preferred are alkali metal oxides or hydroxides; and as the alkaline earth metal compound also to be used herein, preferred are alkaline earth metal oxides or hydroxides.

In the first embodiment, the component (B) alkali metal compound or alkaline earth metal compound is mixed with the component (C) sulfur, for which the amount of the component (B) may fall generally between 0.2 and 3 mols or so, but preferably between 0.3 and 2.5 mols, more preferably between 0.5 and 2 mols, relative to one mol of the component (C). If the amount of the component (B) is smaller than 0.2 mols for the component (C) of being one mol, the sulfidizing capability of the resulting product per the unit weight thereof will be poor. On the other hand, if a larger amount of the component (B) over 3 mols is mixed with the component (C), the excess component (B) could not react with it and will remain as it is. In addition, using too much component (B) is uneconomical.

Before mixed together, it is desirable that the components (B) and (C) are separately ground into small grains having a size of not larger than 5 mm, preferably not larger than 2 mm. If the grain size of the components is larger than 5 mm, the sulfidizing capability of the sealant to be obtained by mixing them will be poor.

In the first embodiment, it is desirable that the components (B) and (C) are, after having been mixed together, heated. This is the second embodiment.

In the second embodiment, the component (B), alkali metal compound or alkaline earth metal compound, and the component (C) sulfur are kneaded at a temperature falling between 50 and 170° C., preferably between 60 and 150° C., for 1 to 20 minutes to obtain a reaction product. If the temperature is lower than 50° C., the alkali metal compound or the alkaline earth metal compound could not be sulfidized smoothly. On the other hand, however, if higher than 170° C., sulfur polymerization will be accelerated. If so, kneading the components (B) and (C) will be difficult, and, in addition, the alkali metal compound or the alkaline earth metal compound could not be sulfidized to a, satisfactory degree. If the reaction time is shorter than 1 minute, the alkali metal compound or the alkaline earth metal compound could not be sulfidized smoothly. On the other hand, however, even if longer than 20 minutes, the reaction could not be promoted any more.

The components (B) and (C) to be kneaded may have various forms. Preferably, they are solid, powdery or flaky.

The ratio of the component (B), alkali metal compound or alkaline earth metal compound, to the component (C) sulfur is the same as that in the first embodiment. Describing it is omitted herein.

In this embodiment, the components (B) and (C) having been kneaded and reacted in melt are cooled in an ordinary manner of, for example, spontaneous cooling, air cooling, water cooling or the like to give the intended reaction product. The reaction product thus obtained is extremely useful as a sealant for heavy metals such as those in heavy metal-containing wastes, etc. For a sealant, in general, the reaction product is cooled and solidified. As the case may be, however, the reaction product of the components (B) and (C) may be directly used as a sealant without being cooled. For example, heavy metal-containing wastes or others may be added to and kneaded in melt with the non-cooled reaction product, whereby the heavy metals in the wastes or others may be sealed with it.

The third and fourth embodiments are described below.

The component (B) is a strong alkali and is deliquescent, and therefore must be stored and handled with care. The component (C) belongs to the dangerous materials stipulated in the Fire Services Act, and its transportation and storage is strictly restricted. Therefore, it is desirable to use a mixture of the component (B) and/or the component (C) with a non-aqueous medium except sulfur, as a sealant as being safe and easy to handle. This indicates using the component (B) and the component (C) separately in the form of individual master batches.

Specifically, the third embodiment is a sealant comprising (B) an alkali metal compound or an alkaline earth metal compound, (C) sulfur, and a non-aqueous medium (except sulfur); and the fourth embodiment is a sealant promoter comprising (B) an alkali metal compound or an alkaline earth metal compound, and a non-aqueous medium (except sulfur), or comprising (C) sulfur, and a non-aqueous medium (except sulfur).

The third embodiment encompasses the mixture of the first embodiment and also the reaction mixture of the second embodiment, to both of which is added a non-aqueous medium except sulfur.

The non-aqueous medium for the third or fourth embodiment may be the same as that for the first aspect of the invention described above, but excluding sulfur.

In the third embodiment, the ratio of the component (B) alkali metal compound or alkaline earth metal compound to the component (C) sulfur may be the same as that in the first embodiment, and describing it herein is omitted.

The amount of the non-aqueous medium to be in the third embodiment varies, depending on its type, and therefore cannot be defined unconditionally. In general, it may fall between 5 and 1000 parts by weight, preferably between 10 and 500 parts by weight, more preferably between 50 and 200 parts by weight, relative to 100 parts by weight of the total of the components (B) and (C). If its amount is smaller than 5 parts by weight, the non-aqueous medium could hardly ensure safe and easily handlable master batches. On the other hand, however, even if a larger amount of the medium over 1000 parts by weight is mixed with the components (B) and (C), it could no more augment the intended effect.

In the fourth embodiment, the amount of the non-aqueous medium may fall generally between 0.1 and 50 parts by weight, preferably between 0.2 and 30 parts by weight, more preferably between 1 and 10 parts by weight, relative to one part by weight of the component (B) or (C). If its amount is smaller than 0.1 parts by weight, the non-aqueous medium could hardly ensure safe and easily handlable master batches. On the other hand, however, even if a larger amount of the medium over 50 parts by weight is mixed with the component (B) or (C), it could no more augment the intended effect.

More concretely, where the non-aqueous medium is asphalt for the component (B), the amount of the component (B) may generally fall between 1 and 1000 parts by weight, preferably between 10 and 500 parts by weight, relative to 100 parts by weight of asphalt. If the amount of the component (B) is too small, its master batch will be meaningless; but if too large, sufficiently covering the surface of wastes with asphalt will be impossible.

Similarly, where the non-aqueous medium is asphalt for the component (C), the amount of the component (C) may generally fall between 0.1 and 1000 parts by weight, preferably between 1 and 700 parts by weight, relative to 100 parts by weight of asphalt. If the amount of the component (C) is too small, the mixture could hardly exhibit its ability to passivate heavy metals; but if too large, the mixture will often ignite at room temperature and will continue to fire, and it shall be a dangerous material stipulated in the Fire Services Act.

In the third and fourth embodiments, the component (B) alkali metal compound or alkaline earth metal compound and/or the component (C) sulfur are/is kneaded with a non-aqueous medium at a temperature falling between 50 and 170° C., preferably between 60 and 150° C. for 1 to 20 minutes to prepare solidified substances. If the temperature is lower than 50° C., the sulfidization of the alkali metal compound or the alkaline earth metal compound will be retarded; but if higher than 170° C., sulfur will form polymeric substances and kneading the mixture will become difficult. In the latter, in addition, sulfur will react with the non-aqueous medium such as asphalt or the like to give hydrogen sulfide. On the other hand, if the reaction time is shorter than 1 minute, the sulfidization of the alkali metal compound or the alkaline earth metal compound will be retarded. However, even if the reaction time is prolonged over 20 minutes, the reaction could not be promoted any more. Like in the second embodiment mentioned above, the component (B) alkali metal compound or alkaline earth metal compound and the component (C) sulfur may be first kneaded, and then further kneaded with a non-aqueous medium to give the solidified substance of this embodiment. In this case, it is desirable that the kneaded blend of the component (B) alkali metal compound or alkaline earth metal compound and the component (C) sulfur is further kneaded with a non-aqueous medium at a temperature not higher than 170° C., preferably not higher than 150° C. If the kneading temperature is higher than 170° C., the crystal water or the adsorbed water of the reaction product will be removed too rapidly. If so, the sulfidizing capability of the resulting solidified substance for passivating heavy metal ions will be poor.

In the invention, it is desirable that the solidified substances obtained in the embodiments noted above are ground into grains having a size of from 1 to 10 mm or so. The grains are referred to as master batch pellets, and are favorably used in the invention.

For example, the component (B) is stirred along with asphalt at 60 to 200° C. for 0.1 to 10 minutes, then cooled, and thereafter ground into master batch pellets having a size of from 1 to 10 mm or so. Similarly, the component (C) is stirred along with asphalt at 60 to 150° C. for 0.1 to 10 minutes, then cooled, and thereafter ground into master batch pellets having a size of from 1 to 10 mm or so.

Alternatively to the above, the master batch pellets of that type may also be produced by cooling the liquid drops of the melt mixture.

The amount of the components (A) to (C) and the non-aqueous medium to be the master batch pellets may be the same as that thereof not to be formed into master batch pellets.

As in the above, the sealant of the embodiments of the third aspect of the invention can be used for treating heavy metal-containing wastes so as to passivate the heavy metals in the treated wastes and to prevent them from being released from the treated wastes.

The solidified substances as formed in the treating methods of the first and second aspects of the invention have high mechanical strength and can be substituents for secondary products of concrete, such as constructional blocks of concrete, etc. In the first and second aspects of the invention, the melt mixture that contains heavy metal-containing wastes may be left as it is for a few minutes, and it may be solidified into high-strength solid substances. Preferably, however, the melt mixture is cooled with air or water, and it can be solidified more rapidly. The melt mixture can be molded with ease. Therefore, it may be filled into a predetermined form, and cooled therein. The resulting moldings can be substituents for secondary products of concrete, such as constructional blocks of concrete, etc. Before the melt mixture is solidified, if desired, it may be mixed with a filler (e.g., aggregate). The filler may be any of gravel, macadam and others, like that for ordinary cement or concrete construction.

The invention is described in more detail with reference to the following Examples, which, however, are not intended to restrict the scope of the invention.

Examples 1 to 22, Comparative Example 1, Reference Examples 1 to 11, and Control Examples 1 and 2 are to demonstrate the first and second aspects of the invention.

[Reference Example 1]

50 g of a chemical reagent, sulfur powder was put into a Teflon-coated metallic vat, the vat was put on a hot plate, and sulfur in the vat was heated up to 130° C. 5 g of powdery sodium hydroxide was added to sulfur being kneaded with a spatula, and it changed brown. Next, 15 g of lead chloride was added thereto, and it immediately changed black. This was kneaded for further 30 minutes, and then cooled, and it solidified. The solidified product was subjected to a lead release test in the manner as follows: The solidified product was ground into grains having a size of at most 5 mm, and 50 g of the grains were sampled. 500 cc of water having a controlled pH value of 6.0 was added to the sample, and shaken continuously for 6 hours by the use of a shaker. Next, this was filtered through a glass paper filter having a pore size of 1 micron, and the lead concentration in the resulting filtrate was measured. It was not larger than 0.1 ppm, and was below the level defined for reclamation work.

In this Reference Example, lead chloride was used in place of wastes.

EXAMPLE 1

60 g of dry fly ash A (pH=5.5) was sampled from the dust in the electric dust collector of a garbage incinerator. Using a mixer, this was mixed with 3 g of sodium hydroxide having been ground in a mortar. In a Teflon-coated vat put on a hot plate, the mixture was melted and kneaded along with 240 g of sulfur powder (this was recovered in a petroleum refining system) by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength by the use of Shimadzu Seisakusho's Autograph AG5000B. The compression speed was 5 mm/min. The data obtained are shown in Table 1. The solidified product was subjected to the same heavy metal release test as in Reference Example 1. As in Table 1, the data were all below the level defined for reclamation work. The pH of the incinerated fly ash tested herein was measured as follows: 10 g of the fly ash was sampled, to which was added 100 cc of ion-exchanged water, and stirred for 3 minutes. The pH of the suspension was measured with a simple pH meter.

EXAMPLE 2

60 of fly ash A (this is the same as in Example 1) was sampled. Using a mixer, this was mixed with 3 g of powdery sodium hydroxide having been ground in a mortar. In a Teflon-coated vat put on a hot plate, the mixture was kneaded in melt with 40 g of a chemical reagent, sulfur powder, and 100 g of asphalt separated in propane deasphaltation (this had a penetration of 5) by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

EXAMPLE 3

In a Teflon vat heated at 80° C., 6 g of a chemical reagent, sulfur powder, and 3 g of powdery sodium hydroxide having been ground in a mortar were mixed by the use of a spatula to obtain a brown melt mixture. This was mixed with 60 g of asphalt separated in propane deasphaltation (this had a penetration of 5), and heated up to 160° C. Next, this was mixed with 60 g of fly ash A (this is the same as in Example 1), and melted and kneaded by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

EXAMPLE 4

10 g of coal ash (having a CaO content of 25% by weight) was suspended in 12 cc of water, and the resulting suspension was added to 60 g of fly ash A (this is the same as in Example 1), and stirred and mixed in a mixer. The mixture was dried in a drier (at 120° C.) for 2 hours. In a Teflon-coated vat, 90 g of a chemical reagent, sulfur powder, and 60 g of asphalt separated in propane deasphaltation (this had a penetration of 5) were melted under heat at 140° C. The resulting melt was mixed with the dry mixture of fly ash A having been prepared previously, by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

[Reference Example 2]

50 g of fly ash A (this is the same as in Example 1) was sampled, to which was added 500 cc of water having been controlled to have a pH of 6.0, and continuously shaken for 6 hours by the use of a shaker. Next, this was filtered through a glass paper filter having a pore size of 1 micron, and the heavy metal concentration in the resulting filtrate was measured. The data obtained are in Table 1. It is seen that the data of the heavy metals released from the sample prepared herein are all much higher than the level defined for reclamation work.

[Comparative Example 1]

60 g of fly ash A (this is the same as in Example 1) was sampled. In a Teflon-coated vat put on a hot plate, this was kneaded in melt with 240 g of sulfur powder (this was recovered in a petroleum refining system) by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. The data obtained are in Table 1. It is seen that the data of the heavy metals released from the sample prepared herein are all much higher than the level defined for reclamation work.

EXAMPLE 5

60 g of fly ash B (pH=11.9, measured in the same manner as in Example 1) was sampled from the dust in the electric dust collector of a garbage incinerator. In a Teflon-coated vat put on a hot plate, this was kneaded in melt with 180 g of a chemical reagent, sulfur powder, by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work. In this Example, the fly ash B tested contained an alkali metal compound. Therefore, the component (B) was not added to it.

[Reference Example 3]

50 g of fly ash B (this is the same as in Example 5) was sampled, to which was added 500 cc of water having been controlled to have a pH of 6.0. The mixture was shaken continuously for 6 hours by the use of a shaker. Next, this was filtered through a glass paper filter having a pore size of 1 micron, and the heavy metal concentration in the resulting filtrate was measured. The data obtained are in Table 1. It is seen that the amount of the heavy metals released from the sample tested herein is relatively large, though not above the level defined for reclamation work.

EXAMPLE 6

Garbage-incinerated ash (this is the main component of the dust given through garbage incineration) was sampled, and sieved through a 5 mm-mesh sieve to remove large grains from it. This was dried in a drier at 120° C. for 3 hours, of which 90 g was sampled. This was mixed with 10 g of coal ash (having a CaO content of 25% by weight) in a mixer. In a Teflon-coated vat put on a hot plate, the mixture was kneaded in melt with 75 g of a chemical reagent, sulfur powder, and 25 g of asphalt separated in propane deasphaltation (this had a penetration of 15) by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

EXAMPLE 7

Garbage-incinerated ash (this is the main component of the dust given through garbage incineration, and is the same as in Example 6) was sampled, and sieved through a 5 mm-mesh sieve to remove large grains from it. This was dried in a drier at 120° C. for 3 hours, of which 90 g was sampled. In a mixer, this was mixed with 3 g of sodium hydroxide having been ground in a mortar. In a Teflon-coated vat put on a hot plate, the mixture was kneaded in melt with 180 g of a chemical reagent, sulfur powder by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

EXAMPLE 8

Garbage-incinerated ash (this is the main component of the dust given through garbage incineration, and is the same as in Example 6) was sampled, and sieved through a 5 mm-mesh sieve to remove large grains from it. This was dried in a drier at 120° C. for 3 hours, of which 90 g was sampled. This was mixed with 10 g of coal ash (having a CaO content of 25% by weight) in a mixer. In a Teflon-coated vat put on a hot plate, the mixture was kneaded in melt with 75 g of a chemical reagent, sulfur powder, and 25 g of low-density polyethylene pellets (having a melt index of 55 g/10 min) by the use of a spatula. The temperature of the mixture was 140° C. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

EXAMPLE 9

6 g of a chemical reagent, sodium sulfide, and 10 g of a chemical reagent, sulfur powder were added to 60 g of straight asphalt (having a penetration of 60), and mixed in a Teflon vat at 110° C .by the use of a spatula. Next, the mixture was further mixed with 60 g fly ash A (this is the same as in Example 1), and kneaded in melt by the use of a spatula. After having been thus kneaded for 30 minutes, a part of the melt mixture was filled into a stainless form having a size of 10×10×40 mm, and spontaneously cooled and solidified therein. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

[Reference Example 4]

50 g of garbage-incinerated ash (this is the main component of the dust given through garbage incineration, and is the same as in Example 6) was sampled, to which was added 500 cc of water having been controlled to have a pH of 6.0. The mixture was shaken continuously for 6 hours by the use of a shaker. Next, this was filtered through a glass paper filter having a pore size of 1 micron, and the heavy metal concentration in the resulting filtrate was measured. The data obtained are in Table 1. It is seen that the amount of the heavy metals released from the sample tested herein is relatively large, though not above the level defined for reclamation work.

EXAMPLE 10

100 g of asphalt separated in propane deasphaltation (this had a penetration of 5) and 100 g of a chemical reagent, sulfur powder were put into a stainless container, heated at 140° C. and kneaded for 10 minutes with stirring. After thus kneaded, this was cooled and ground into grains having a size of around 5 mm. This is referred to as sample A. On the other hand, 100 g of asphalt separated in propane deasphaltation (this had a penetration of 5) was put into another stainless container, and heated at 140° C., to which was added 100 g of powdery sodium hydroxide. The mixture was kneaded for 3 minutes with stirring, then cooled, and ground into grains having a size of around 5 mm. This is referred to as sample B.

A one-liter stainless container was heated at 140° C., and 100 g of fly ash C (pH=12.5, measured in the same manner as in Example 1) was put into it. This was stirred under heat for 30 minutes, and 44 g of asphalt separated in propane deasphaltation (this had a penetration of 5) was added thereto. Next, 20 g the sample A was added thereto, and kneaded with stirring. Stirring it was continued, and after 30 minutes, 12 g of the sample B was added thereto. Stirring it was further continued for 15 minutes. Next, this was cooled to room temperature and solidified. The solidified product was measured for its compression strength in the same manner as in Example 1. The data obtained are shown in Table 1. The solidified product was subjected to the same heavy metal release test as in Reference Example 1. As in Table 1, the data were all below the level defined for reclamation work.

[Reference Example 5]

50 g of fly ash C (this is the same as in Example 10) was sampled, to which was added 500 cc of water having been controlled to have a pH of 6.0. The mixture was shaken continuously for 6 hours by the use of a shaker. Next, this was filtered through a glass paper filter having a pore size of 1 micron, and the heavy metal concentration in the resulting filtrate was measured. The data obtained are in Table 1. It is seen that the data of the heavy metals released from the sample prepared herein are all much higher than the level defined for reclamation work.

TABLE 1

| | Amount of Heavy Metals Released (mg/liter) | Compression Strength (MPa) |
|---|---|---|
| Ref. Example 1 | Pb < 0.1 ppm | — |
| Example 1 | Pb < 0.1; Cd < 0.1; Cr < 0.1 | 30.0 |
| Example 2 | Pb < 0.1; Cd < 0.1; Cr < 0.1 | 4.0 |
| Example 3 | Pb < 0.1; Cd < 0.1; Cr < 0.1 | 3.4 |
| Example 4 | Pb = 0.15; Cd < 0.1; Cr < 0.1 | 12.7 |
| Ref. Example 2 | Pb = 155; Cd = 30; Cr = 5.1 | — |
| Comp. Example 1 | Pb = 15; Cd = 7.0; Cr < 0.1 | 26.5 |
| Example 5 | Pb < 0.1; Cd < 0.1; Cr < 0.1 | 27.4 |
| Ref. Example 3 | Pb = 0.23; Cd < 0.1; Cr < 0.1 | — |
| Example 6 | Pb < 0.1; Cd < 0.1; Cr < 0.1 | 11.8 |
| Example 7 | Pb < 0.1; Cd < 0.1; Cr < 0.1 | 15.7 |
| Example 8 | Pb < 0.1; Cd < 0.1; Cr < 0.1 | 10.0 |
| Example 9 | Pb < 0.1; Cd < 0.1; Cr < 0.1 | 1.5 |
| Ref. Example 4 | Pb = 0.13; Cd < 0.1; Cr < 0.1 | — |
| Example 10 | Pb < 0.1; Cd < 0.1; Cr < 0.1 | 6.8 |
| Ref. Example 5 | Pb = 800; Cd < 0.1; Cr < 0.1 | — |

EXAMPLE 11

60 g of asphalt separated in propane deasphaltation (this had a penetration of 5) was put into a one-liter stainless container, and heated at 140° C. After the asphalt was heated, 100 g of dry fly ash A (this was sampled from the dust in the electric dust collector of a garbage incinerator, and had a pH of 5.5) was added thereto little by little with stirring. After the fly ash A was added, 3 g of a chemical reagent, sulfur powder was added thereto. Stirring it was continued, and 20 minutes after the sulfur addition, 2 g of powdery sodium hydroxide was added to it. Stirring it was further continued for 15 minutes. Next, this was cooled to room temperature and solidified. The solidified product was subjected to a lead release test in the manner as follows: The solidified product was ground, and sieved through a resin sieve to collect grains having a size of from 0.5 to 5 mm. 50 g of the grains were sampled, to which was added 500 cc of water having been controlled to have a pH of 6.0. The mixture was shaken continuously for 6 hours by the use of a shaker. Next, this was filtered through a glass paper filter having a pore size of 1 micron, and the lead concentration in the resulting filtrate was measured. The lead concentration measured was not larger than 0.1 ppm (mg/liter—the same shall apply hereunder), and was below the level defined for reclamation work.

The pH of the fly ash tested herein was measured as follows: 10 g of the fly ash was sampled, to which was added 100 cc of ion-exchanged water, and stirred for 3 minutes. The pH of the suspension was measured with a simple pH meter.

EXAMPLE 12

60 g of asphalt separated in propane deasphaltation (this had a penetration of 5) was put into a one-liter stainless container, and heated at 140° C. After the asphalt was heated, 100 g of fly ash A (this is the same as in Example 11) was added thereto little by little with stirring. After the fly ash A was added, 10 g of a chemical reagent, sulfur powder was added thereto. Stirring it was continued, and 20 minutes after the sulfur addition, 6 g of powdery sodium hydroxide was added to it. Stirring it was further continued for 15 minutes. Next, this was cooled to room temperature and solidified. The solidified product was subjected to the same lead release test as in Example 11. The amount of lead released was not larger than 0.1 ppm, and was below the level defined for reclamation work.

EXAMPLE 13

A one-liter stainless container was heated at 140° C., and 100 g of fly ash A (this is the same as in Example 11) was put into it. Next, 200 g of a chemical reagent, sulfur powder was added thereto, and melted with stirring. Stirring it was continued, and 30 minutes after the sulfur added was melted, 6 g of powdery sodium hydroxide was added to it. Stirring it was further continued for 15 minutes. Next, this was cooled to room temperature and solidified. The solidified product was subjected to the same lead release test as in Example 11. The amount of lead released was not larger than 0.1 ppm, and was below the level defined for reclamation work.

EXAMPLE 14

60 g of asphalt separated in propane deasphaltation (this had a penetration of 5) and 10 g of a chemical reagent, sulfur powder were put into a one-liter stainless container, and kneaded under heat at 140° C. with stirring. To the resulting melt mixture, added was 100 g of fly ash A (this is the same as in Example 11) little by little with further stirring. Stirring it was continued for 30 minutes, and 6 g of powdery sodium hydroxide was added to it. Stirring it was further continued for 15 minutes. Next, this was cooled to room temperature and solidified. The solidified product was subjected to the same lead release test as in Example 11. The amount of lead released was not larger than 0.1 ppm, and was below the level defined for reclamation work.

EXAMPLE 15

A one-liter stainless container was heated at 140° C., and 100 g of fly ash A (this is the same as in Example 11) was put into it. This was stirred under heat for 30 minutes, and 60 g of asphalt separated in propane deasphaltation (this had a penetration of 5), and 10 g of a chemical reagent, sulfur powder were added thereto, and melted with stirring. Stirring it was continued, and after 30 minutes, 6 g of powdery sodium hydroxide was added to it. Stirring it was further continued for 15 minutes. Next, this was cooled to room temperature and solidified. The solidified product was subjected to the same lead release test as in Example 11. The amount of lead released was not larger than 0.1 ppm, and was below the level defined for reclamation work.

EXAMPLE 16

100 g of asphalt separated in propane deasphaltation (this had a penetration of 5) and 100 g of a chemical reagent, sulfur powder were put into a stainless container, heated at 140° C. and kneaded for 10 minutes with stirring. After thus kneaded, this was cooled and ground into grains having a size of around 5 mm. This is referred to as sample A. On the other hand, 100 g of asphalt separated in propane deasphaltation (this had a penetration of 5) was put into another stainless container, and heated at 140° C., to which was added 100 g of powdery sodium hydroxide. The mixture was kneaded for 3 minutes with stirring, then cooled, and ground into grains having a size of around 5 mm. This is referred to as sample B.

A one-liter stainless container was heated at 140° C., and 100 g of fly ash A (this is the same as in Example 11) was put into it. This was stirred under heat for 30 minutes, and 44 g of asphalt separated in propane deasphaltation (this had a penetration of 5) was added thereto. Next, 20 g the sample A was added thereto, and kneaded with stirring. Stirring it was continued, and after 30 minutes, 12 g of the sample B was added thereto. Stirring it was further continued for 15 minutes. Next, this was cooled to room temperature and solidified. The solidified product was subjected to the same lead release test as in Example 11. The amount of lead released was not larger than 0.1 ppm, and was below the level defined for reclamation work.

As in this Example, separately pelletizing sulfur and sodium hydroxide into different master pellets makes the sulfur mixture non-dangerous and improves the operation efficiency.

[Reference Example 6]

60 g of asphalt separated in propane deasphaltation (this had a penetration of 5) was put into a one-liter stainless container, and heated at 140° C. After the asphalt was heated, 100 g of fly ash A (this is the same as in Example 11) was added thereto little by little with stirring. After the fly ash A was added, 6 g of powdery sodium hydroxide was added thereto. Stirring it was continued, and 20 minutes after the addition of sodium hydroxide, 10 g of a chemical reagent, sulfur powder was added to it. Stirring it was further continued for 15 minutes. Next, this was cooled to room temperature and solidified. The solidified product was subjected to the same lead release test as in Example 11. The amount of lead released was 155 ppm.

[Reference Example 7]

60 g of asphalt separated in propane deasphaltation (this had a penetration of 5) was put into a one-liter stainless container, and heated at 140° C. After the asphalt was heated, 100 g of fly ash A (this is the same as in Example 11) was added thereto little by little with stirring. After the fly ash A was added, 6 g of powdery sodium hydroxide and 10 g of sulfur powder was added thereto both at the same time. Stirring it was continued for 30 minutes. Next, this was cooled to room temperature and solidified. The solidified product was subjected to the same lead release test as in Example 11. The amount of lead released was 80 ppm.

[Reference Example 8]

6 g of powdery sodium hydroxide and 100 g of fly ash A (this is the same as that in Example 11) were mixed in a mixer for 2 minutes. The mixture was put into a one-liter stainless container heated at 140° C. To this was added 60 g of asphalt separated in propane deasphaltation (this had a penetration of 5). After the asphalt became completely liquid, stirring the mixture was started. 10 minutes after stirring the mixture was started, 10 g of a chemical reagent, sulfur powder was added to the mixture, and stirring it was continued further for 30 minutes. Next, this was cooled to room temperature and solidified. The solidified product was subjected to the same lead release test as in Example 11. The amount of lead released was 220 ppm.

EXAMPLE 17

60 g of asphalt separated in propane deasphaltation (this had a penetration of 5) was put into a one-liter stainless container, and heated at 140° C. After the asphalt was heated, 100 g of fly ash B (pH=5.3, measured in the same manner as in Example 11) was added thereto little by little with stirring. After fly ash B was added, 2 g of a chemical reagent, sulfur powder was added thereto. Stirring it was further continued. 20 minutes after the sulfur addition, 1 g of powdery sodium hydroxide was added thereto, and stirring it was still further continued for 15 minutes. Next, this was cooled to room temperature and solidified. The solidified product was subjected to the same lead release test as in Example 11. The amount of lead released was not larger than 0.03 ppm, and was below the level defined for reclamation work.

[Reference Example 9]

60 g of asphalt separated in propane deasphaltation (this had a penetration of 5) was put into a one-liter stainless container, and heated at 140° C. After the asphalt was heated, 100 g of fly ash B (this is the same as in Example 17) was added thereto little by little with stirring. After the fly ash B was added, 1 g of powdery sodium hydroxide was added thereto. Stirring it was further continued. 15 minutes after the addition of sodium hydroxide, 2 g of a chemical reagent, sulfur powder was added to it. Stirring it was further continued for 20 minutes. Next, this was cooled to room temperature and solidified. The solidified product was subjected to the same lead release test as in Example 11. The amount of lead released was 0.09 ppm, and was below the level defined for reclamation work. However, it is seen that lead was released from the solidified product.

[Control Example 1]

50 g of fly ash A (this is the same as in Example 11) was sampled, to which was added 500 cc of water having been controlled to have a pH of 6.0, and continuously shaken for 6 hours by the use of a shaker. Next, this was filtered through a glass paper filter having a pore size of 1 micron, and the lead concentration in the resulting filtrate was measured. The lead concentration measured was 1500 ppm, and was much higher than the level defined for reclamation work.

[Control Example 2]

50 g of fly ash B (this is the same as in Example 17) was sampled, to which was added 500 cc of water having been controlled to have a pH of 6.0, and continuously shaken for 6 hours by the use of a shaker. Next, this was filtered through a glass paper filter having a pore size of 1 micron, and the lead concentration in the resulting filtrate was measured. The lead concentration measured was 98 ppm, and was much higher than the level defined for reclamation work.

The data of the above Examples, Reference Examples and Control Examples are summarized in Table 2.

TABLE 2

| Order of Addition | 1 | 2 | 3 | 4 | Amount of Pb Released |
|---|---|---|---|---|---|
| Example 11 | asphalt 60 g | fly ash A 100 g | sulfur 3 g | sodium hydroxide 2 g | not larger than 0.1 ppm |
| Example 12 | asphalt 60 g | fly ash A 100 g | sulfur 10 g | sodium hydroxide 6 g | not larger than 0.1 ppm |
| Example 13 | fly ash A 100 g | sulfur 200 g | sodium hydroxide 6 g | — | not larger than 0.1 ppm |
| Example 14 | asphalt 60 g | sulfur 10 g | fly ash A 100 g | sodium hydroxide 6 g | not larger than 0.1 ppm |
| Example 15 | fly ash A 100 g | asphalt 60 g | sulfur 10 g | sodium hydroxide 6 g | not larger than 0.1 ppm |
| Example 16 | fly ash A 100 g | asphalt 44 g | sample A 20 g | sample B 12 g | not larger than 0.1 ppm |
| Ref. Example 6 | asphalt 60 g | fly ash A 100 g | sodium hydroxide 6 g | sulfur 10 g | 155 ppm |
| Ref. Example 7 | asphalt 60 g | fly ash A 100 g | sodium hydroxide 6 g sulfur 10 g | | 80 ppm |
| Ref. Example 8 | sodium hydroxide 6 g fly ash A 100 g | | asphalt 60 g | sulfur 10 g | 220 ppm |

TABLE 2-continued

| Order of Addition | 1 | 2 | 3 | 4 | Amount of Pb Released |
|---|---|---|---|---|---|
| Example 17 | asphalt 60 g | fly ash B 100 g | sulfur 2 g | sodium hydroxide 1 g | not larger than 0.03 ppm |
| Ref. Example 9 | asphalt 60 g | fly ash B 100 g | sodium hydroxide 1 g | sulfur 2 g | not larger than 0.09 ppm |
| Cont. Example 1 | fly ash A 60 g | | | | 1500 ppm |
| Cont. Example 2 | fly ash B 60 g | | | | 98 ppm |

EXAMPLE 18

60 g of asphalt separated in propane deasphaltation (this had a penetration of 5), 100 g of dry fly ash A (pH =12.5) sampled from the dust in the electric dust collector of a garbage incinerator, and 10 g of a chemical reagent, sulfur powder were put into a one-liter stainless container heated at 140° C., and kneaded in melt therein for 30 minutes. To the resulting melt mixture, added was 6 g of powdery sodium hydroxide, and stirring it was continued for 15 minutes. Next, 14 g of grains of ferrous sulfate 7-hydrate was gradually added thereto, and stirring it was continued further for 10 minutes. Then, this was cooled to room temperature and solidified. The solidified product was subjected to a lead lease test and a polysulfide release test each in the manner as follows: The solidified product was ground and sieved through a resin sieve to prepare grains having a size of from 0.5 to 5 mm. 50 g of the grains were sampled. 500 cc of water having a controlled pH value of 6.0 was added to the sample, and shaken continuously for 6 hours by the use of a shaker. Next, this was filtered through a glass paper filter having a pore size of 1 micron, and the resulting filtrate was macroscopically checked for its appearance as to whether or not it was colored. Having been thus checked, the filtrate was found not colored. This proved release of no polysulfide from the sample. In addition, the lead concentration in the filtrate was measured. It was not larger than 0.1 ppm (mg/liter-the same shall apply hereunder), and was below the level defined for reclamation work.

The pH of the fly ash tested herein was measured as follows: 10 g of the fly ash was sampled, to which was added 100 cc of ion-exchanged water, and stirred for 3 minutes. The pH of the suspension was measured with a simple pH meter.

EXAMPLE 19

60 g of asphalt separated in propane deasphaltation (this had a penetration of 5), 100 g of fly ash A (this is the same as in Example 18), and 10 g of a chemical reagent, sulfur powder were put into a one-liter stainless container heated at 140° C., and kneaded in melt therein for 30 minutes. To the melt mixture, added was 3 g of powdery sodium hydroxide, and stirring it was continued for 15 minutes. Next, 10 g of grains of ferric sulfate hydrate were gradually added thereto, and stirring it was continued further for 10 minutes. Then, this was cooled to room temperature and solidified. The solidified product was subjected to the same lead release test and the same polysulfide release test as in Example 18. The lead concentration measured was not higher than 0.1 ppm, and was below the level defined for reclamation work. No polysulfide was found released from the sample tested.

EXAMPLE 20

60 g of asphalt separated in propane deasphaltation (this had a penetration of 5), 100 g of fly ash A (this is the same as in Example 18), and 10 g of a chemical reagent, sulfur powder were put into a one-liter stainless container heated at 140° C., and kneaded in melt therein for 30 minutes. To the melt mixture, added was 3 g of powdery sodium hydroxide, and stirring it was continued for 15 minutes. Next, 8 g of grains of aluminum sulfate hydrate were gradually added thereto, and stirring it was continued further for 10 minutes. Then, this was cooled to room temperature and solidified. The solidified product was subjected to the same lead release test and the same polysulfide release test as in Example 18. The lead concentration measured was not higher than 0.1 ppm, and was below the level defined for reclamation work. No polysulfide was found released from the sample tested.

EXAMPLE 21

60 g of asphalt separated in propane deasphaltation (this had a penetration of 5), 100 g of fly ash A (this is the same as in Example 18), and 10 g of a chemical reagent, sulfur powder were put into a one-liter stainless container heated at 140° C., and kneaded in melt therein for 30 minutes. To the melt mixture, added was 3 g of powdery sodium hydroxide, and stirring it was continued for 15 minutes. Next, 3 g of grains of aluminum chloride 6-hydrate were gradually added thereto, and stirring it was continued further for 10 minutes. Then, this was cooled to room temperature and solidified. The solidified product was subjected to the same lead release test and the same polysulfide release test as in Example 18. The lead concentration measured was not higher than 0.1 ppm, and was below the level defined for reclamation work. No polysulfide was found released from the sample tested.

EXAMPLE 22

60 g of asphalt separated in propane deasphaltation (this had a penetration of 5), 100 g of fly ash A (this is the same as in Example 18), and 10 g of a chemical reagent, sulfur powder were put into a one-liter stainless container heated at 140° C., and kneaded in melt therein for 30 minutes. To the melt mixture, gradually added was 20 g of sodium sulfide 9-hydrate, and stirring it was continued for 15 minutes. Next, 10 g of grains of ferrous sulfate 7-hydrate were gradually added thereto, and stirring it was continued further for 10 minutes. Then, this was cooled to room temperature and solidified. The solidified product was subjected to the same lead release test and the same polysulfide release test as in Example 18. The lead concentration measured was not higher than 0.1 ppm, and was below the level defined for reclamation work. No polysulfide was found released from the sample tested.

[Reference Example 10]

60 g of asphalt separated in propane deasphaltation (this had a penetration of 5), 100 g of fly ash A (this is the same as in Example 18), and 10 g of a chemical reagent, sulfur powder were put into a one-liter stainless container heated at 140° C., and kneaded in melt therein for 30 minutes. To the melt mixture, added was 6 g of powdery sodium hydroxide, and stirring it was continued for 15 minutes. Then, this was cooled to room temperature and solidified. The solidified product was subjected to the same lead release test and the same polysulfide release test as in Example 18. The lead concentration measured was not higher than 0.1 ppm, and was below the level defined for reclamation work. However, the filtrate was yellow, indicating some polysulfides released from the sample.

[Reference Example 11]

60 g of asphalt separated in propane deasphaltation (this had a penetration of 5), 100 g of fly ash A (this is the same as in Example 18), and 10 g of a chemical reagent, sulfur powder were put into a one-liter stainless container heated at 140° C., and kneaded in melt therein for 30 minutes. To the melt mixture, added was 3 g of powdery sodium hydroxide, and stirring it was continued for 15 minutes. Then, this was cooled to room temperature and solidified. The solidified product was subjected to the same lead release test and the same polysulfide release test as in Example 18. The lead concentration measured was not higher than 0.1 ppm, and was below the level defined for reclamation work. However, the filtrate was yellow, indicating some polysulfides released from the sample.

The following Examples are to demonstrate the third aspect of the invention.

EXAMPLE 23

32 g of powder of sulfur (first class grade chemical reagent) and 120 g granular sodium hydroxide were mixed in a flask to prepare sample A.

Next, 100 g of the sample A was put into a 500 ml separable flask, and heated at 100° C. in an oil bath with stirring. The sample A came brown, opaque and fluid, and did not give hydrogen sulfide. 40 g of fly ash A was added thereto, and stirring it was continued further for 10 minutes. Then, this was left cooled and solidified. The solidified product was ground into grains having a size of from 0.5 to 5 mm. 50 g of the grains were put into 500 ml of water having a controlled pH of 6.0, and shaken for 6 hours by the use of a shaker. Next, the resulting blend was filtered through a glass filter having a pore size of 1 micron, and the concentration of lead (Pb) and cadmium (Cd) in the resulting filtrate was measured. The Pb and Cd concentration in the filtrate was found not higher than 0.3 ppm each, and was below the level defined for reclamation work.

Fly ash A used in Example 23 was sampled from the dust in the dust collector of a melting furnace, and its pH was 6. The amount of Pb and Cd released from it was 60 and 38 mg/liter, respectively. The pH of the fly ash A was measured as follows: 10 g of the fly ash was sampled, to which was added 100 cc of ion-exchanged water, and stirred for 3 minutes. The pH of the suspension was measured with a simple pH meter. The amount of Pb and Cd released was measured according to the metal release test stipulated in Notification No. 13 of the Director General of the Environment Agency of Japan.

EXAMPLE 24

32 g of powder of sulfur (first class grade chemical reagent) and 80 g granular sodium hydroxide were mixed in a flask to prepare sample B.

40 g of fly ash A (this is the same as in Example 23) and 40 g of the sample B were put into a laboratory plastomill heated at 90° C., and kneaded therein for 15 minutes. Then, this was left cooled and solidified. The solidified product was ground into grains having a size of from 0.5 to 5 mm. 50 g of the grains were put into 500 ml of water having a controlled pH of 6.0, and shaken for 6 hours by the use of a shaker. Next, the resulting blend was filtered through a glass filter having a pore size of 1 micron, and the concentration of Pb and Cd in the resulting filtrate was measured. The Pb and Cd concentration in the filtrate was found not higher than 0.3 ppm each, and was below the level defined for reclamation work.

EXAMPLE 25

In a flask, 32 g of powder of sulfur (first class grade chemical reagent) was mixed with 12 g of granular sodium hydroxide and 50 g of asphalt having a penetration of 75 to prepare sample C.

40 g of fly ash A (this is the same as in Example 23) and 20 g of the sample C were put into a laboratory plastomill heated at 90° C., and kneaded therein for 15 minutes. Then, this was left cooled and solidified. The solidified product was ground into grains having a size of from 0.5 to 5 mm. 50 g of the grains were put into 500 ml of water having a controlled pH of 6.0, and shaken for 6 hours by the use of a shaker. Next, the resulting blend was filtered through a glass filter having a pore size of 1 micron, and the concentration of Pb and Cd in the resulting filtrate was measured. The Pb and Cd concentration in the filtrate was found not higher than 0.3 ppm each, and was below the level defined for reclamation work.

EXAMPLE 26

32 g of powder of sulfur (first class grade chemical reagent) and 120 g of sodium hydroxide were put into a 500 ml separable flask, and heated at 100° C. in an oil bath with stirring to prepare sample A. In that stage, the sample A came brown, opaque and fluid, and did not give hydrogen sulfide. Then, this was left cooled and solidified. The solidified product was ground into grains having a size of from 0.5 to 5 mm. This is sealant A.

2 g of the sealant A was heated on a hot plate at 100° C., and it came fluid. To this was added 1 g of lead chloride, and stirred with a spatula. It immediately changed black. Then, this was left cooled and solidified. Through X-ray diffractometry, the solidified product was identified as lead sulfide.

Next, 40 g of fly ash A (this is the same as in Example 23), 10 g of water, and 12 g of the sealant A were put into a laboratory plastomill and stirred therein for 10 minutes at room temperature. The resulting mixture was left at room temperature for 1 week and solidified. The solidified product was ground into grains having a size of from 0.5 to 5 mm. 50 g of the grains were put into 500 ml of water having a controlled pH of 6.0, and shaken for 6 hours by the use of a shaker. Next, the resulting blend was filtered through a glass filter having a pore size of 1 micron, and the concentration of Pb and Cd in the resulting filtrate was measured. The Pb and Cd concentration in the filtrate was found not higher than 0.3 ppm each, and was below the level defined for reclamation work.

EXAMPLE 27

40 g of fly ash A (this is the same as in Example 23), 6 g of Portland cement, 10 g of water, and 12 g of the sealant A (this was prepared in Example 26) were put into a laboratory plastomill and stirred therein for 10 minutes at room temperature. The resulting mixture was left at room temperature for 1 day and solidified. The solidified product was ground into grains having a size of from 0.5 to 5 mm. 50 g of the grains were put into 500 ml of water having a controlled pH of 6.0, and shaken for 6 hours by the use of a shaker. Next, the resulting blend was filtered through a glass filter having a pore size of 1 micron, and the concentration of Pb and Cd in the resulting filtrate was measured. The Pb and Cd concentration in the filtrate was found not higher than 0.3 ppm each, and was below the level defined for reclamation work.

EXAMPLE 28

32 g of powder of sulfur (first class grade chemical reagent), 500 g of asphalt having a penetration of 52, and 120 g of sodium hydroxide were put into a 1000 ml separable flask, and heated at 100° C. in an oil bath with stirring to prepare sample A. In that stage, the sample A came brown, opaque and fluid, and did not give hydrogen sulfide. Then, this was left cooled and solidified. While cooled with liquid nitrogen, the solidified product was ground into grains having a size of from 0.5 to 5 mm. This is sealant B.

2 g of the sealant B was heated on a hot plate at 100° C., and it came fluid. To this was added 0.2 g of lead chloride, and stirred with a spatula. It was left cooled and solidified. Through X-ray diffractometry, the solidified product was identified as lead sulfide.

Next, 40 g of fly ash A (this is the same as in Example 23), and 16 g of the sealant B were put into a laboratory plastomill heated at 100° C., and stirred therein for 20 minutes. The resulting mixture was left cooled and solidified. The solidified product was ground into grains having a size of from 0.5 to 5 mm. 50 g of the grains were put into 500 ml of water having a controlled pH of 6.0, and shaken for 6 hours by the use of a shaker. Next, the resulting blend was filtered through a glass filter having a pore size of 1 micron, and the concentration of Pb and Cd in the resulting filtrate was measured. The Pb and Cd concentration in the filtrate was found not higher than 0.3 ppm each, and was below the level defined for reclamation work.

EXAMPLE 29

120 g of the sealant A prepared in Example 26, and 600 g of asphalt having a penetration of 52 were put into a 1000 ml separable flask, and heated at 100° C. in an oil bath with stirring. Then, this was left cooled and solidified. The solidified product was ground into grains having a size of from 0.5 to 5 mm. This is sealant C.

2 g of the sealant C was heated on a hot plate at 100° C., and it came fluid. To this was added 0.1 g of lead chloride, and stirred with a spatula. It was left cooled and solidified. Through X-ray diffractometry, the solidified product was identified as lead sulfide.

Next, 40 g of fly ash A (this is the same as in Example 23), and 25 g of the sealant C were put into a laboratory plastomill heated at 100° C., and stirred therein for 20 minutes. The resulting mixture was left cooled and solidified. The solidified product was ground into grains having a size of from 0.5 to 5 mm. 50 g of the grains were put into 500 ml of water having a controlled pH of 6.0, and shaken for 6 hours by the use of a shaker. Next, the resulting blend was filtered through a glass filter having a pore size of 1 micron, and the concentration of Pb and Cd in the resulting filtrate was measured. The Pb and Cd concentration in the filtrate was found not higher than 0.3 ppm each, and was below the level defined for reclamation work.

INDUSTRIAL APPLICABILITY

According to the present invention, the heavy metals in heavy metal-containing wastes can be efficiently passivated, and the heavy metals and even excess polysulfides are prevented from being released from the wastes. The invention contributes to the protection of the environment. The solidified substances of the wastes having been treated in the invention have high mechanical strength and are favorable to civil engineering materials such as roadbed materials, subgrade materials and others, and also to constructional materials such as constructional blocks and others substitutable for secondary products of concrete.

What is claimed is:

1. A method for treating heavy metal-containing waste, which consists essentially of:

melting and kneading (A) heavy metal-containing waste, (B) an alkali metal or an alkaline earth metal hydroxide or oxide and (C) sulfur in the presence of a non-aqueous medium selected from the group consisting of at least one of sulfur, asphalt, thermoplastic resin and thermosetting resin, all components (A), (B) and (C) reacting at 90–200° C. thereby passivating the heavy metal waste (A) component, the amount of sulfur as component (C) or component (C) together with sulfur as the selected non-aqueous medium, being sufficient for its function of dispersing components (A), (B) and (C), and for its function of passivating heavy metals, and then cooling and solidifying the resulting melt mixture.

2. The method for treating heavy metal-containing wastes as claimed in claim 1, wherein component (B) is combined with sulfur of component (C) in the non-aqueous medium in the form of master batch pellets.

3. A solidified substance which is formed by the method of claim 1, which has a mechanical strength sufficient for the application of the solidified substance as a construction material.

4. A method for treating heavy metal-containing wastes, which consists essentially of:

melting and kneading (A) heavy metal-containing wastes, (B) an alkali metal or an alkaline earth metal hydroxide or oxide, (C) sulfur and (E) a salt of a metal of which the standard reduction potential is higher than that of the cation of the component (B), in the presence of a non-aqueous medium selected from the group consisting of at least one of sulfur, asphalt, thermoplastic resin and thermosetting resin, all components (A), (B) and (C) reacting at 90–200° C. thereby passivating the heavy metal waste (A) component, the amount of sulfur as component (C) or component (C) together with sulfur as the selected non-aqueous medium, being sufficient for its function of dispersing components (A), (B) (C) and (B) and for its function of passivating heavy metals, and then cooling and solidifying the resulting melt mixture.

5. A method for treating heavy metal-containing waste, which consists essentially of:

melting and kneading (A) heavy metal-containing wastes, (B) an alkali metal or an alkaline earth metal hydroxide or oxide and (C) sulfur in the presence of a non-aqueous medium selected from the group consisting of at least one of sulfur, asphalt, thermoplastic resin and thermosetting resin, all components (A), (B) and (C) reacting at 90–200° C. thereby passivating the heavy metal waste (A) component, the amount of sulfur as component (C) or component (C) together with sulfur as the selected non-aqueous medium being sufficient for its function of dispersing components (A), (B) and (C) and for its function of passivating heavy metals, and then cooling and solidifying the resulting melt mixture, wherein the component (A) and the component (C) are melted and kneaded before the component (B) is added thereto.

* * * * *

UNITED STATES PATENT AND TRADEMARK OFFICE

CERTIFICATE OF CORRECTION

PATENT NO. : 6,638,204 B2 
DATED : October 28, 2003
INVENTOR(S) : Mizutani et al.

It is certified that error appears in the above-identified patent and that said Letters Patent is hereby corrected as shown below:

Title page,
Item [45] and Item [*] Notice, should read as follows:
-- [45] **Date of Patent: *Oct. 28, 2003**

[*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 99 days. --

Signed and Sealed this

Thirtieth Day of December, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,638,204 B2

DATED : October 28, 2003

INVENTOR(S) : Makoto Mizutani et al.

It is certified that error appears in the above-identified patent and that said Letters Patent is hereby corrected as shown below:

Title page,

Item [56], References Cited, FOREIGN PATENT DOCUMENTS, should read as follows:

| | | |
|---|---|---|
| -- JP | 49-72176 | 07/1974 |
| JP | 6-246253 | 09/1994 |
| JP | 7-88458 | 04/1995 |
| JP | 7-290024 | 11/1995 |
| JP | 8-3317 | 1/1996 -- |

Signed and Sealed this

Thirty-first Day of August, 2004

JON W. DUDAS

*Director of the United States Patent and Trademark Office*